United States Patent
Smith et al.

(10) Patent No.: US 10,337,454 B2
(45) Date of Patent: Jul. 2, 2019

(54) THRUST REVERSER WITH ASYMMETRIC VANE GEOMETRY

(71) Applicant: HONEYWELL INTERNATIONAL INC., Morris Plains, NJ (US)

(72) Inventors: Danis Burton Smith, Chandler, AZ (US); Shawn Alstad, Peoria, AZ (US); John Taylor Pearson, Phoenix, AZ (US); Morris Anderson, Mesa, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 771 days.

(21) Appl. No.: 15/005,357

(22) Filed: Jan. 25, 2016

(65) Prior Publication Data
US 2017/0211511 A1    Jul. 27, 2017

(51) Int. Cl.
| | |
|---|---|
| *F02K 1/72* | (2006.01) |
| *F02K 1/56* | (2006.01) |
| *F02K 1/70* | (2006.01) |
| *F01D 9/04* | (2006.01) |
| *F01D 25/24* | (2006.01) |
| *F01D 25/28* | (2006.01) |

(52) U.S. Cl.
CPC ............... *F02K 1/72* (2013.01); *F01D 9/041* (2013.01); *F01D 25/24* (2013.01); *F01D 25/28* (2013.01); *F02K 1/563* (2013.01); *F02K 1/70* (2013.01); *F05D 2220/323* (2013.01); *F05D 2250/73* (2013.01)

(58) Field of Classification Search
CPC . F02K 1/56; F02K 1/563; F02K 1/566; F02K 1/605; F02K 1/62; F02K 1/625; F02K 1/64; F02K 1/70; F02K 1/72
See application file for complete search history.

(56) References Cited

U.S. PATENT DOCUMENTS

| | | | | |
|---|---|---|---|---|
| 2,620,623 | A * | 12/1952 | Imbert | F02K 1/566 239/265.27 |
| 3,172,256 | A * | 3/1965 | Ward | F02K 1/62 60/229 |
| 3,279,181 | A * | 10/1966 | Beavers | F02K 1/68 60/226.2 |
| 3,640,468 | A | 2/1972 | Searle et al. | |

(Continued)

FOREIGN PATENT DOCUMENTS

| | | |
|---|---|---|
| EP | 0848153 A1 | 6/1998 |
| EP | 0699273 B1 | 9/1999 |

(Continued)

OTHER PUBLICATIONS

EP Examination Report for Application No. 16206027.1 dated Sep. 7, 2018.

(Continued)

*Primary Examiner* — Gerald L Sung
*Assistant Examiner* — Marc J Amar
(74) *Attorney, Agent, or Firm* — Lorenz & Kopf, LLP (57) ABSTRACT

A thrust reverser system having an asymmetric vane assembly is provided. The provided thrust reverser system generates a desired vertical thrust component that at least partially offsets a potential nose-up pitch moment. The provided thrust reverser system employs a single row asymmetric vane geometry that reduces weight and material cost.

8 Claims, 11 Drawing Sheets

(56) References Cited

U.S. PATENT DOCUMENTS

| | | | |
|---|---|---|---|
| 3,717,304 A | 2/1973 | Sutton | |
| 4,073,440 A * | 2/1978 | Hapke | F02K 1/74 239/265.29 |
| 4,183,478 A | 1/1980 | Rudolph | |
| 4,731,991 A * | 3/1988 | Newton | F02K 1/72 239/265.31 |
| 4,790,495 A | 12/1988 | Greathouse et al. | |
| 5,228,641 A | 7/1993 | Remlaoui | |
| 5,507,143 A * | 4/1996 | Luttgeharm | F02K 1/563 239/265.31 |
| 5,671,598 A | 9/1997 | Standish | |
| 6,000,216 A | 12/1999 | Vauchel | |
| 6,029,439 A * | 2/2000 | Gonidec | F02K 1/70 239/265.29 |
| 6,151,885 A | 11/2000 | Metezeau et al. | |
| 6,151,886 A | 11/2000 | Vauchel | |
| 6,968,675 B2 * | 11/2005 | Ramlaoui | F02K 1/72 60/226.1 |
| 8,051,639 B2 | 8/2011 | Lair | |
| 8,015,797 B2 | 9/2011 | Lair | |
| 8,302,907 B2 | 11/2012 | Welch et al. | |
| 8,316,632 B2 | 11/2012 | West et al. | |
| 8,528,857 B2 | 9/2013 | Hillereau et al. | |
| 8,783,010 B2 | 7/2014 | Guillois et al. | |
| 9,109,462 B2 | 8/2015 | Suciu et al. | |
| 9,719,466 B2 * | 8/2017 | Nakhjavani | F02K 1/827 |
| 2004/0068978 A1 * | 4/2004 | Lair | F02K 1/70 60/226.2 |
| 2004/0079073 A1 * | 4/2004 | Ramlaoui | F02K 1/72 60/226.2 |
| 2005/0229584 A1 * | 10/2005 | Tweedie | F02K 1/72 60/226.1 |
| 2008/0072571 A1 * | 3/2008 | Beardsley | F02K 1/72 60/226.2 |
| 2011/0146230 A1 * | 6/2011 | LaChapelle | B64D 27/18 60/226.2 |
| 2013/0056554 A1 | 3/2013 | Guillois et al. | |
| 2013/0118599 A1 * | 5/2013 | James | B64D 29/00 137/15.1 |
| 2014/0030057 A1 | 1/2014 | Gormley | |
| 2015/0267642 A1 * | 9/2015 | Gormley | F02K 1/80 239/265.19 |
| 2015/0291289 A1 | 10/2015 | Chandler et al. | |
| 2015/0308376 A1 * | 10/2015 | James | F02K 1/72 239/265.19 |
| 2016/0047333 A1 * | 2/2016 | Starovic | F02K 1/72 239/265.19 |
| 2016/0076487 A1 * | 3/2016 | Nakhjavani | F02K 1/827 239/265.19 |
| 2016/0230702 A1 * | 8/2016 | Charron | F02K 1/72 |
| 2017/0009704 A1 * | 1/2017 | Dong | F02K 1/72 |
| 2017/0204809 A1 * | 7/2017 | Smith | F01D 9/041 |

FOREIGN PATENT DOCUMENTS

| | | |
|---|---|---|
| EP | 1416147 A1 | 5/2004 |
| EP | 2949910 A1 | 12/2015 |
| WO | 2014074144 A1 | 5/2014 |
| WO | 2014176427 A1 | 10/2014 |

OTHER PUBLICATIONS

Extended EP Search Report for Application No. 17151096.9-1607 dated Jun. 13, 2017.

Bangert, L. S. et al.; Static Internal Performance of a Nonaxisymmetric Vaned Thrust Reverser With Flow Splay Capability; NASA Technical Paper 2933 1989.

Extended EP Search Report for Application No. 16206027.1-1607 dated Apr. 28, 2017.

USPTO Office Action for U.S. Appl. No. 14/995,396 dated May 8, 2018.

USPTO Final Office Action for U.S. Appl. No. 14/995,396 dated Dec. 3, 2018.

* cited by examiner

THRUST REVERSER WITH ASYMMETRIC VANE GEOMETRY

TECHNICAL FIELD

The present invention relates to a thrust reverser system for a turbine engine, and more particularly to a thrust reverser system with asymmetric vane geometry.

BACKGROUND

When turbine-powered aircraft land, the wheel brakes and the imposed aerodynamic drag loads (e.g., flaps, spoilers, etc.) of the aircraft may not be sufficient to achieve the desired stopping distance, therefore, most turbine-powered aircraft include thrust reversers. Turbine-powered aircraft typically include aircraft powered by turbofan engines, turbojet engines, or the like. Thrust reversers enhance the stopping power of these aircraft by redirecting the turbine engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers are typically positioned circumferentially around the engine core and affect only the bypass airflow discharged from the engine fan. Whereas, mixed flow thrust reversers typically reside aft of the engine core and affect both the fan bypass airflow and the airflow discharged from the engine core (core airflow).

Typically, deployment of the thrust reverser means translating aft one or more sleeves or cowls ("transcowls") thereby creating a circumferential aperture and exposing a plurality of rows and columns of cascade vanes disposed therein. Some thrust reversers use a blocking mechanism, such as two or more pivoting doors that simultaneously rotate, blocking the forward thrust flow path as the transcowl translates aft. The blocking mechanism redirects engine airflow, generally forcing it to discharge through the aforementioned plurality of cascade vanes disposed within the aperture. Redirecting the engine airflow in this manner causes the engine and thrust reverser to produce a net force in a direction substantially parallel with the thrust reverser centerline, and substantially opposite the direction of aircraft velocity, in order to decelerate the aircraft. Thrust produced in this manner is generally referred to as "reverse thrust".

While the above described thrust reversers produce a reverse thrust that is desirable for decelerating the aircraft, these thrust reversers can also cause an undesirable nose-up pitch moment to be generated. This pitch moment occurs due to the vertical separation between the thrust reverser centerline and the aircraft center of gravity. This pitch moment can be particularly severe on aircraft with engines mounted relatively high on the fuselage or empennage. This pitch moment is undesirable because it reduces the effectiveness of the nose wheel steering, and can thereby reduce the ability of the pilot to control the aircraft. In some instances, the nose-up pitch moment may even lift the nose gear off the ground. To avoid these hazards, the reverse thrust may have to be limited, but this reduces the benefit of using thrust reversers.

Hence, there is a need for a thrust reverser system that is capable of reducing or eliminating this nose-up pitch moment. The desirable thrust reverser system employs asymmetric vane geometry that, in addition to producing reverse thrust, also produces a vertical thrust component that induces a nose-down pitch moment on the aircraft. The desirable thrust reverser also minimizes weight and material cost by employing a single row asymmetric vane geometry.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A thrust reverser system for a turbine engine is provided. The thrust reverser system, comprising: a support structure configured to be mounted to the engine; a transcowl mounted on the support structure and comprising a front edge, the transcowl movable between a first position, in which the front edge abuts the support structure, and a second position, in which an aperture is formed between the front edge and the support structure; a blocking assembly mounted within the transcowl and configured to direct engine airflow to discharge through the aperture, to thereby generate reverse thrust, when the transcowl is in the second position; and an asymmetric vane assembly disposed within the aperture and configured such that an upper portion of the asymmetric vane assembly is asymmetric with respect to a lower portion of the asymmetric vane assembly, thereby generating a desired vertical thrust component based on the reverse thrust.

Another thrust reverser system for a turbine engine is provided, comprising: an annular support structure configured to be mounted to the engine; a transcowl mounted on the support structure and forming a portion of a nacelle surrounding the turbofan engine, the transcowl movable between a first position, in which a front edge of the transcowl abuts the support structure, and a second position, in which an aperture is formed between the front edge and the support structure; and an asymmetric vane assembly disposed within the aperture and configured such that an upper portion of the asymmetric vane assembly is asymmetric with respect to a lower portion of the asymmetric vane assembly, thereby generating a desired vertical thrust component when the transcowl is in the second position.

Also provided is a turbine engine, comprising: a thrust reverser system, comprising: (a) a support structure configured to be mounted to the engine; (b) a transcowl mounted on the support structure and comprising a front edge, the transcowl movable between a first position, in which the front edge abuts the support structure, and a second position, in which an aperture is formed between the front edge and the support structure; (c) a blocking assembly mounted within the transcowl and configured to direct engine airflow to discharge through the aperture, to thereby generate reverse thrust, when the transcowl is in the second position; and an asymmetric vane assembly disposed within the aperture and configured such that an upper portion of the asymmetric vane assembly is asymmetric with respect to a lower portion of the asymmetric vane assembly, thereby generating a desired vertical thrust component based on the reverse thrust when the transcowl is in the second position.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

Various embodiments are directed to a thrust reverser system suitable for an aircraft turbine engine, and methods for producing the same. Turbofan engines having translatable cowl thrust reversers are suitable applications; the thrust reverser itself may take many forms, such as, but not limited to, a fan flow and mixed flow variety. As will be apparent from the detail below, the exemplary embodiments advantageously provide reverse thrust with a vertical thrust component to at least partially offset the nose-up pitch moment often experienced by aircraft employing contemporary thrust reverser designs. The embodiments described below are merely examples and serve as a guide for implementing the novel systems and methods herein on any industrial, commercial, military, or consumer aircraft turbine engine application. As such, the examples presented herein are intended as non-limiting.

Figure 1:
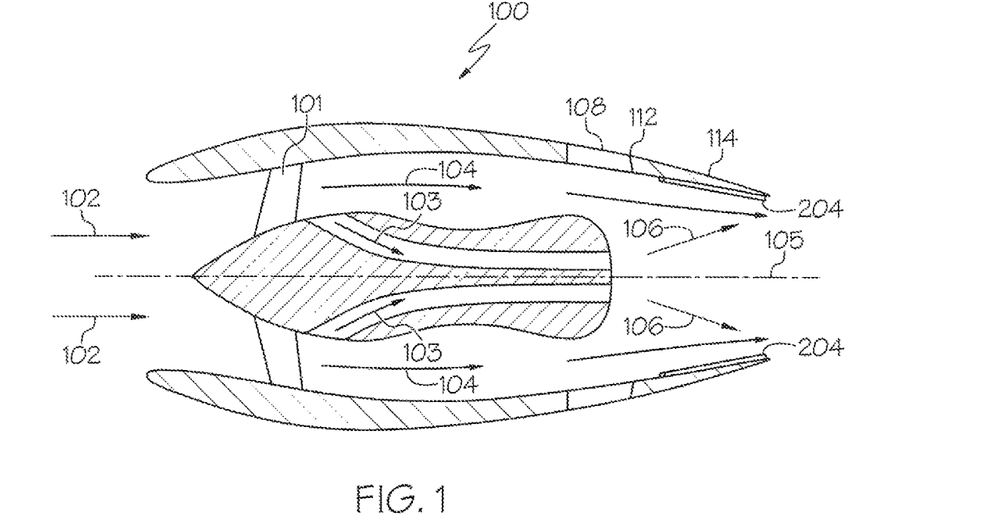
FIG. 1 is a simplified illustration of a turbofan engine with the thrust reverser stowed, in a forward thrust position.
Figure 2:
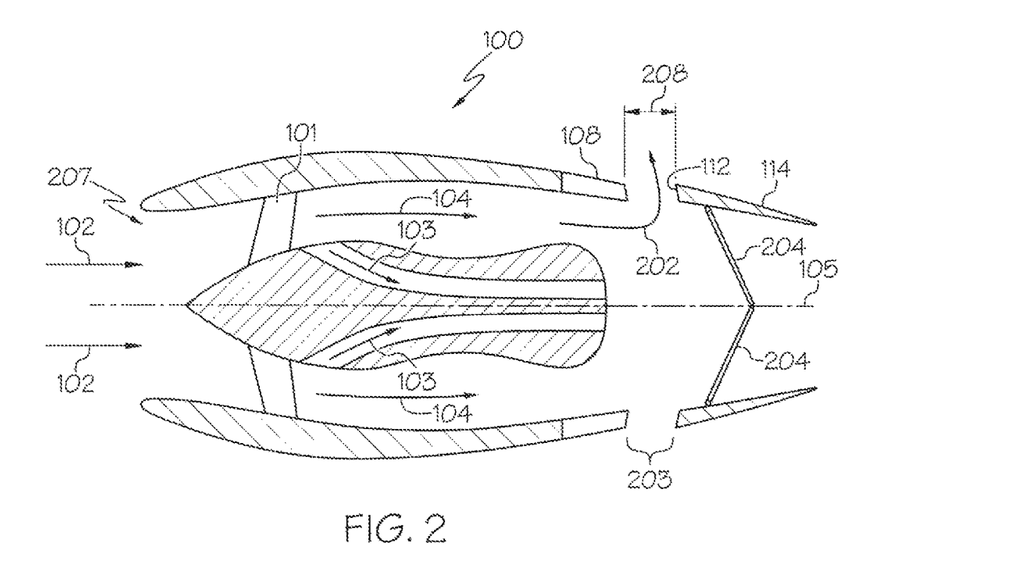
FIG. 2, is a simplified illustration of the turbofan engine of FIG. 1 with the thrust reverser in the deployed, or reverse thrust position.

The turbofan engine is a component of an aircraft's propulsion system that typically generates thrust by means of an accelerating mass of gas. FIG. 1 is a simplified cross-section view of a traditional aircraft turbofan engine with thrust reverser in a forward, or stowed, first position. FIG. 2 is a simplified cross-section view of the turbofan engine of FIG. 1 with thrust reverser in a deployed, second position; in the second position, above described nose-up pitch moment phenomenon may occur.

Turning now to FIG. 1, a turbofan engine is substantially encased within an aerodynamically smooth outer covering, the nacelle 100. Nacelle 100 wraps around the turbofan engine and forms an aerodynamically shaped cavity around an engine centerline 105, thereby providing a flow path for engine exhaust flow 106 when the aircraft is generating forward thrust. Ambient air 102 enters the turbofan engine and passes through a fan 101. A portion of this air will be pressurized, mixed with fuel and ignited, generating hot gasses known as core flow 103. The remainder of this air bypasses the engine core and is known as fan flow 104. Together, fan flow and core flow become the engine exhaust flow 106 that is discharged, generating forward thrust.

Nacelle 100 includes a thrust reverser system comprising a stationary support structure 108 and an annular translatable cowl, or transcowl 114. The support structure 108 has an annular shape and may include associated support beams (FIG. 3, 306) to provide a rigid annular structure to which moveable transcowl 114 may be mounted. The support structure 108 typically also serves to mount the thrust reverser system to the turbofan engine. Transcowl 114 is mounted adjacent to the support structure 108 and extends aft therefrom. In a forward thrust position of a typical thrust reverser system, a front edge 112 of the transcowl 114 abuts with the support structure 108, creating a substantially smooth and continuous cavity for the fan flow 104 and engine exhaust flow 106 during generation of forward thrust.

FIG. 2 is a simplified cross-sectional view of the turbofan engine of FIG. 1 with thrust reverser in a deployed, second position, to generate reverse thrust. Generally, the thrust reverser transitions to the deployed, second position, by translating transcowl 114 aft from the support structure 108 by a predetermined distance 208, forming aperture 203 and creating an active reverse flow path therethrough. Concurrent with the transcowl movement aft, a blocking assembly mounted within the transcowl 114 generally performs a blocking function for the engine exhaust flow 106, thereby redirecting it (directing it forward and radially). Accordingly, when the transcowl is in the second position, the blocking assembly directs engine airflow to discharge through the aperture 203.

Generally, the blocking assembly comprises displaceable blocker doors 204 and associated mounting and actuation hardware and software. Although not the focus of the present invention, a variety of different mechanisms (not shown) may be used to couple displaceable blocker doors 204 to transcowls such that they stow and deploy in tandem. These mechanisms could range from a single connecting link to a complex kinematic linkage system. In any of the possible combinations, this linkage system is what transfers the linear transcowl motion into a blocking function, such as, by rotary (pivoting) internal door motion.

Figure 3:
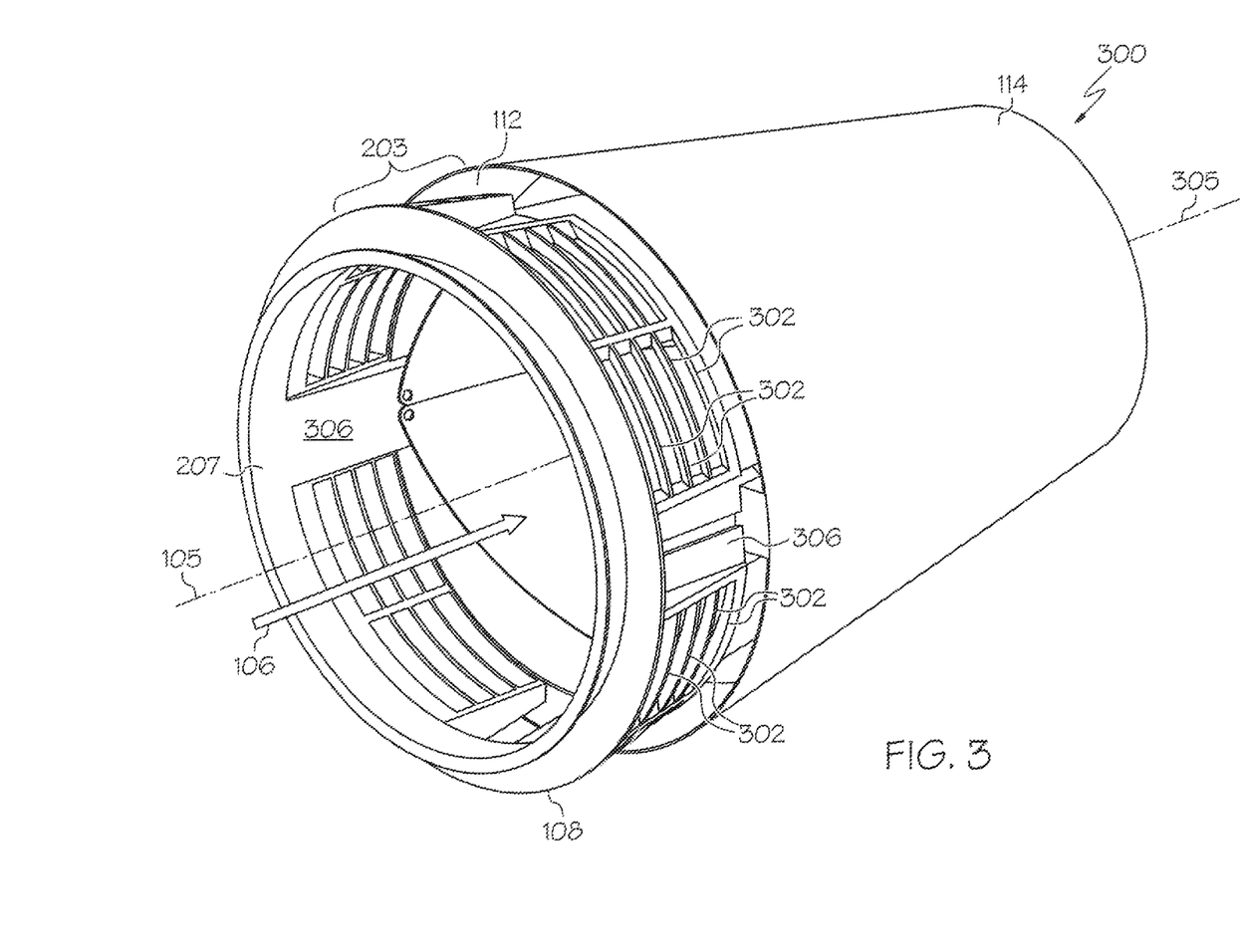
FIG. 3 is a three dimensional image of a thrust reverser system similar to the one depicted in FIG. 1 and FIG. 2, showing cascade vanes disposed within an aperture created when the transcowl is in the deployed (second) position.

In many designs, a plurality of vanes are disposed within the reverse flow path at the aperture 203, and arranged in a plurality of rows and columns, in the form of a cascade (accordingly, they are often referred to as "cascade vanes"). While stowed, the plurality of cascade vanes (FIG. 3, cascade vanes 302) are covered by the transcowl 114, and when deployed, the transcowl 114 exposes the cascade vanes (FIG. 3, cascade vanes 302). In FIG. 3, a thrust reverser with cascade vanes is illustrated.

FIG. 3 is a three dimensional image of a thrust reverser system 300 similar to the one depicted in FIG. 1 and FIG. 2, showing cascade vanes disposed within an aperture 203 created when the transcowl 114 is in the deployed (second) position. The aperture 203 extends circumferentially around the thrust reverser centerline 305, which is substantially collinear with engine centerline 105. In a typical arrangement, a plurality of rows and columns of symmetrically shaped cascade vanes 302 are disposed within the aperture 203 to direct turbofan engine exhaust flow 106 through the aperture 203 when the reverse flow path is active. In this configuration, the turbofan engine and thrust reverser generally produce a net force in a direction substantially parallel with the thrust reverser centerline 305 in order to decelerate an aircraft (i.e., the reverse thrust); the active reverse flow path can induce a nose-up pitch moment, as described above.

Figure 4:
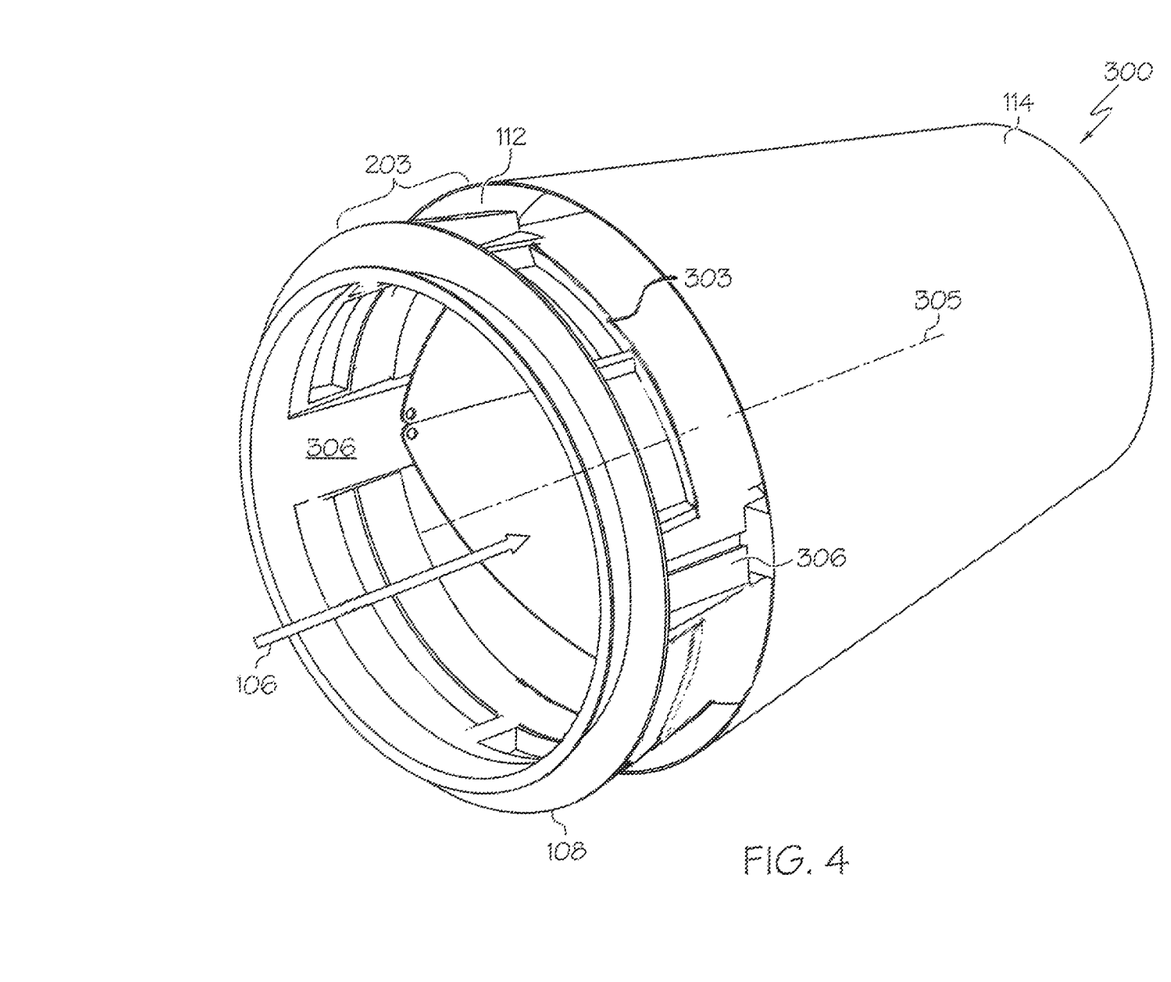
FIG. 4 is a three dimensional image of a thrust reverser system similar to the one depicted in FIG. 1 and FIG. 2, showing a single row vane assembly disposed within an aperture created when the transcowl is in the deployed (second) position.

FIG. 4 is a three dimensional image of thrust reverser system 300 similar to the one depicted in FIG. 1 and FIG. 2, showing an alternate arrangement using a single row vane assembly 303 within the aperture 203. A single row vane assembly comprises one or more vanes arranged within the aperture 203 so that any imaginary line drawn parallel with the thrust reverser centerline through aperture 203 (i.e. between the support structure 108 and the transcowl 114) intersects at most one vane. Although this arrangement may provide weight or cost benefits relative to the arrangement depicted in FIG. 3, the turbofan engine and thrust reverser will still produce a net force in a direction substantially parallel with the thrust reverser centerline 305, and can therefore induce a nose-up pitch moment, as described above. Concepts presented herein provide improvements to this design by introducing a single row vane assembly with asymmetry between an upper portion of the thrust reverser system and a lower portion of the thrust reverser system.

Figure 5:
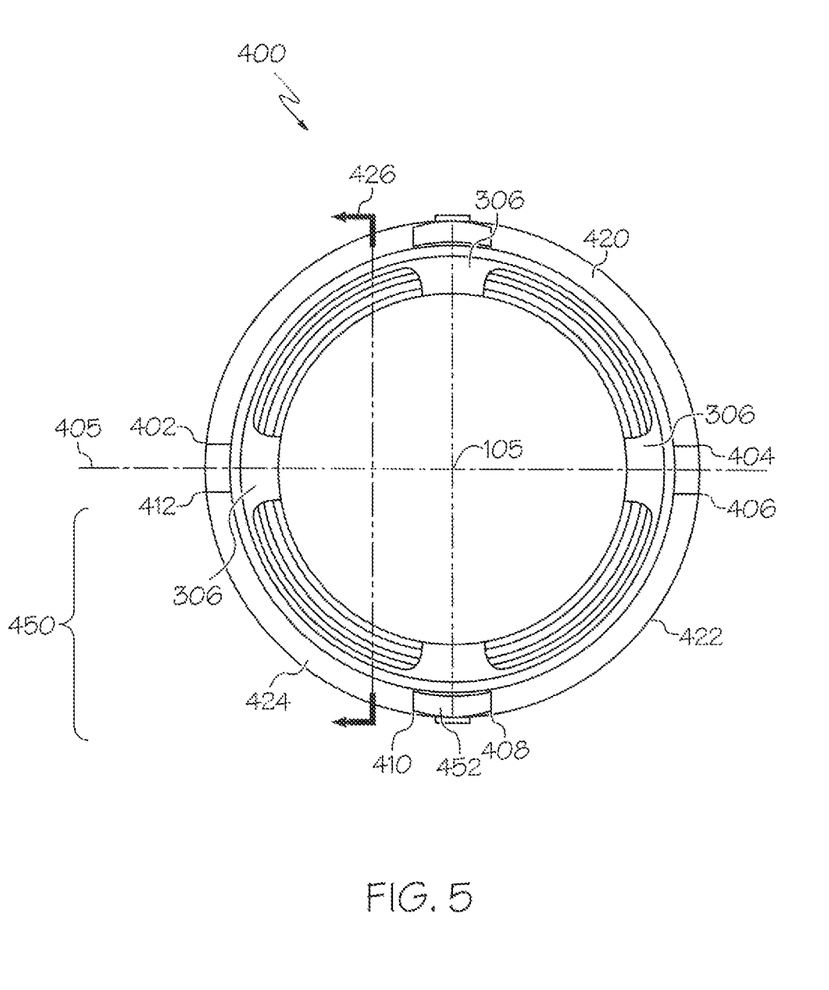
FIG. 5 is a cutaway view, forward looking aft, of a thrust reverser system such as that shown in FIG. 3 or FIG. 4.

FIG. 5 is provided to define terminology with respect to an upper and lower portion of the thrust reverser system. FIG. 5 is a simplified view of a thrust reverser system 400, from the perspective of looking inward (and aftward) from the forward side 207. The thrust reverser system 400 has a circular cross section divided by a horizontal plane through centerline 405; centerline 405 divides upper portion 420 (extending from 402 to 404) from lower portion 450. Lower portion 450 comprises a first section 422 (extending from 406 to 408), and a second section 424 (extending from 410 to 412). In the embodiment shown, there are four support beams 306. However, any number of support beams could be used.

Cutaway line 426 is slightly off-center, and bisects the thrust reverser system 400. The cutaway line 426, extended into a plane, is used to create cutaway views of a thrust reverser system that are presented in the following figures.

Figure 6:
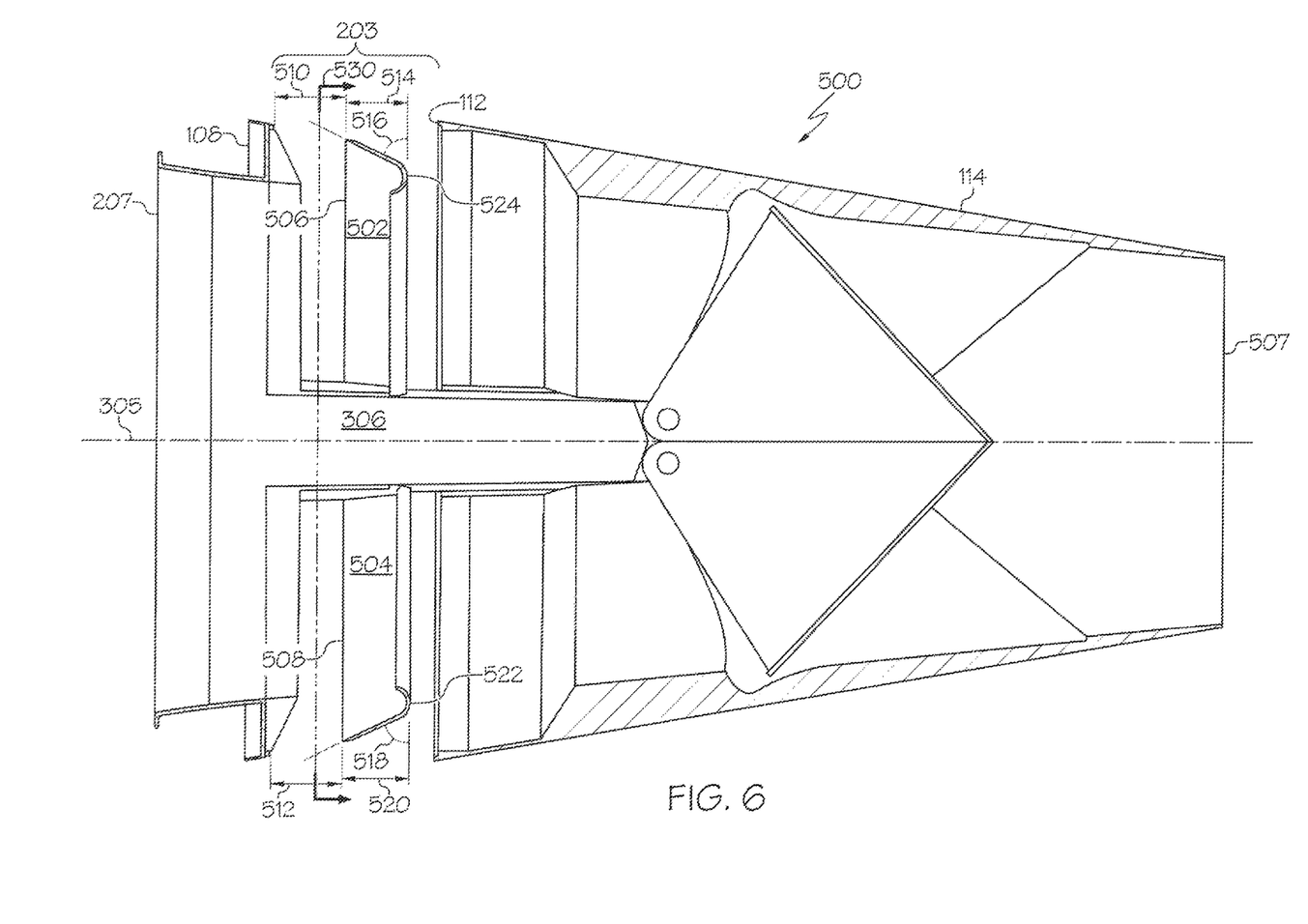
FIG. 6 is a cutaway view, outboard looking inboard, of a thrust reverser system having a symmetric single row vane assembly.

FIG. 6 is a cutaway view of a thrust reverser system 500 having a single row vane assembly, and is illustrated to establish dimensions that are varied to create asymmetry presented in the embodiments shown in FIGS. 7-12. As used herein, "a single row" means that any imaginary line drawn parallel with the thrust reverser centerline through aperture 203 (i.e., between the support structure 108 and the transcowl 114) intersects at most one vane, circumferentially disposed within aperture 203, as is depicted in FIGS. 4 and 6-12.

The cutaway view shown is taken along cutaway line 426, and extends from forward side 207 to aft side 507. The single row vane assembly is substantially circular, comprising an upper portion 420 (shown comprising vane 502), and a lower portion 450 (shown comprising vane 504). Vanes 502 and 504 are shown coupled to a support beam 306. The single row vane assembly is substantially coaxial with the thrust reverser centerline 305 and coupled coaxially to the support structure 108. A person with skill in the art may appreciate that, in three dimensions, the depicted vane 502 may extend circumferentially and substantially define upper portion 420 of the single row vane assembly; likewise, the depicted vane 504 may extend circumferentially and substantially define lower portion 450 of the single row vane assembly. The single row vane assembly is disposed within the aperture 203 as follows.

The upper portion of single row vane assembly has a first vane trailing edge 506 positioned a distance L1 510 from the support structure 108 (reference vane 502). The lower portion of single row vane assembly has a second vane trailing edge 508 positioned a distance L2 512 from the support structure 108 (reference vane 504). As depicted with vane 502, upper portion of single row vane assembly is shaped to curve forward at an exit angle alpha 516 from a first knee 524, wherein exit angle alpha 516 is measured between the first vane trailing edge 506 and a plane extending perpendicularly from the thrust reverser centerline 305; a width W1 514 is defined as a distance from the first vane trailing edge 506 to the first knee 524. Similarly, and as depicted with vane 504, lower portion of the single row vane assembly is shaped to curve forward at an exit angle gamma 518 from a second knee 522, wherein exit angle alpha 518 is measured between the second vane trailing edge 508 and a plane extending perpendicularly from the thrust reverser centerline 305; a width W2 520 is defined as a distance from the second vane trailing edge 508 to the second knee 522. Exit angle alpha 516 and exit angle gamma 518 are measured from a vertical plane that is perpendicular to the thrust reverser centerline 305. As a starting reference, setting dimensions of L1 substantially equal to L2, W1 substantially equal to W2, and exit angle alpha substantially equal to exit angle gamma results in a single row vane assembly that is substantially symmetric with respect to the horizontal centerline 405.

Figure 7:
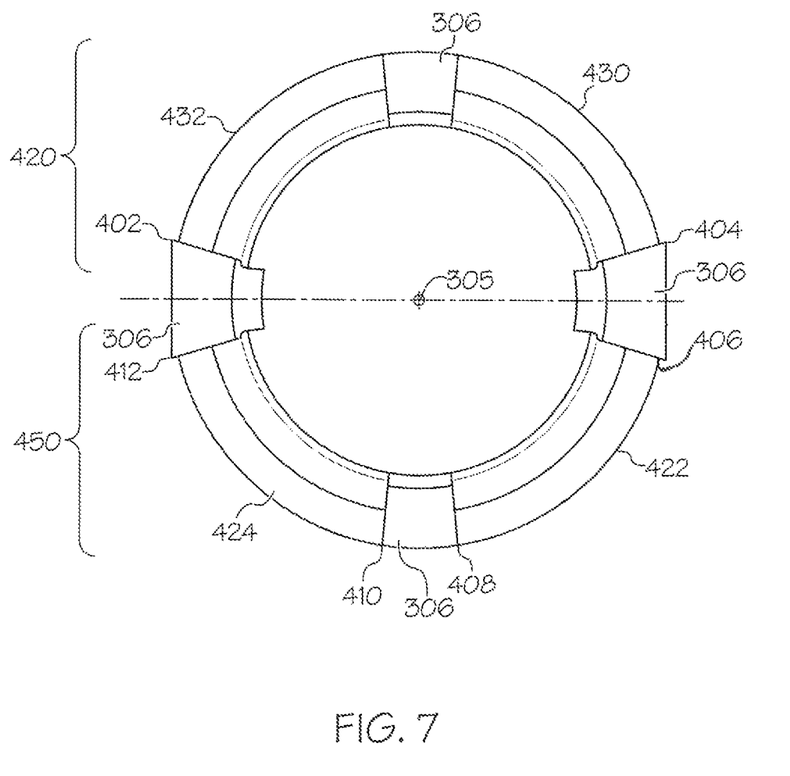
FIG. 7 is a cutaway view, forward looking aft, of the symmetric single row vane assembly of FIG. 6.

FIG. 7 is a cutaway view, forward looking aft, of the single row vane assembly depicted in FIG. 6. The cutaway view shown is taken along cutaway line 530. As is apparent from FIG. 6, the combination of support beams 306, upper portion 420, first section 422, and second section 424, substantially encircles a cavity through which engine exhaust flow 106 (not shown) travels. The upper portion 420 and lower portion 450 may each comprise a plurality of vanes. The figures presented hereinbelow minimize the number of vanes and support beams 306 for simplifying purposes, however, a person with skill in the art will readily appreciate that various combinations of numbers of support beams 306 and vanes may satisfy the inventive concept. An arrangement as presented in FIG. 7 results in a single row vane assembly that is substantially symmetric with respect to the horizontal centerline 405.

The embodiments shown in FIGS. 8-12 introduce a variety of approaches to employ asymmetric vane geometry with a single row vane assembly (asymmetry of the vane geometry is presented with respect to horizontal centerline 405). The asymmetry of vane geometry is employed to manipulate a flow path for reverse thrust through the aperture 203, generating, from reverse thrust, a desired vertical thrust component that offsets at least a portion of the undesirable nose-up pitch moment. The embodiments below present one asymmetric vane geometry approach at a time for ease of comprehension, however, it is readily understood that in practice, the various approaches may be combined to meet an application specific need.

Figure 8:
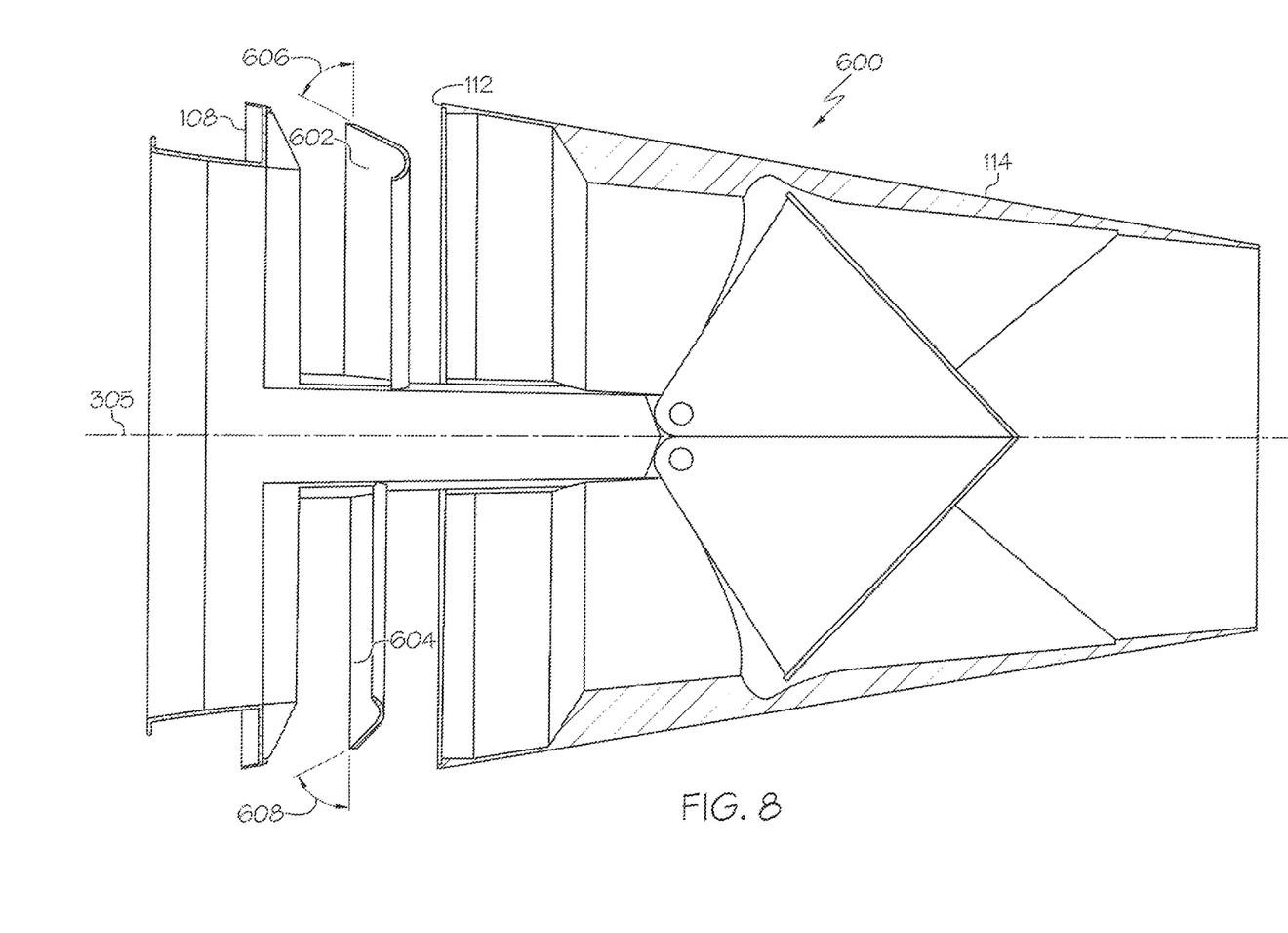
FIG. 8 is a cutaway view, outboard looking inboard, of a thrust reverser system according to an exemplary embodiment.

FIG. 8 is a cutaway view of a thrust reverser system according to an exemplary embodiment. In FIG. 8, upper portion 420 (comprising vane 602) is asymmetric with respect to lower portion 450 (comprising vane 604) comprising a single row asymmetric vane assembly. As previously described, exit angle alpha 606 is measured from a vertical plane that is perpendicular to the thrust reverser centerline 305, and exit angle gamma 608 is measured from a vertical plane that is perpendicular to the thrust reverser centerline 305. In FIG. 8, L1 is equal to L2, W1 is equal to W2, and exit angle alpha is greater than exit angle gamma. In an embodiment, exit angle alpha is greater than forty five degrees and exit angle gamma is less than forty five degrees. Configuring the upper portion 420 (comprising vane 602) and lower portion 450 (comprising vane 604) such that exit angle alpha is greater than exit angle gamma results in the generation of a desired vertical thrust component that offsets at least a portion of the undesirable nose-up pitch moment.

Figure 9:
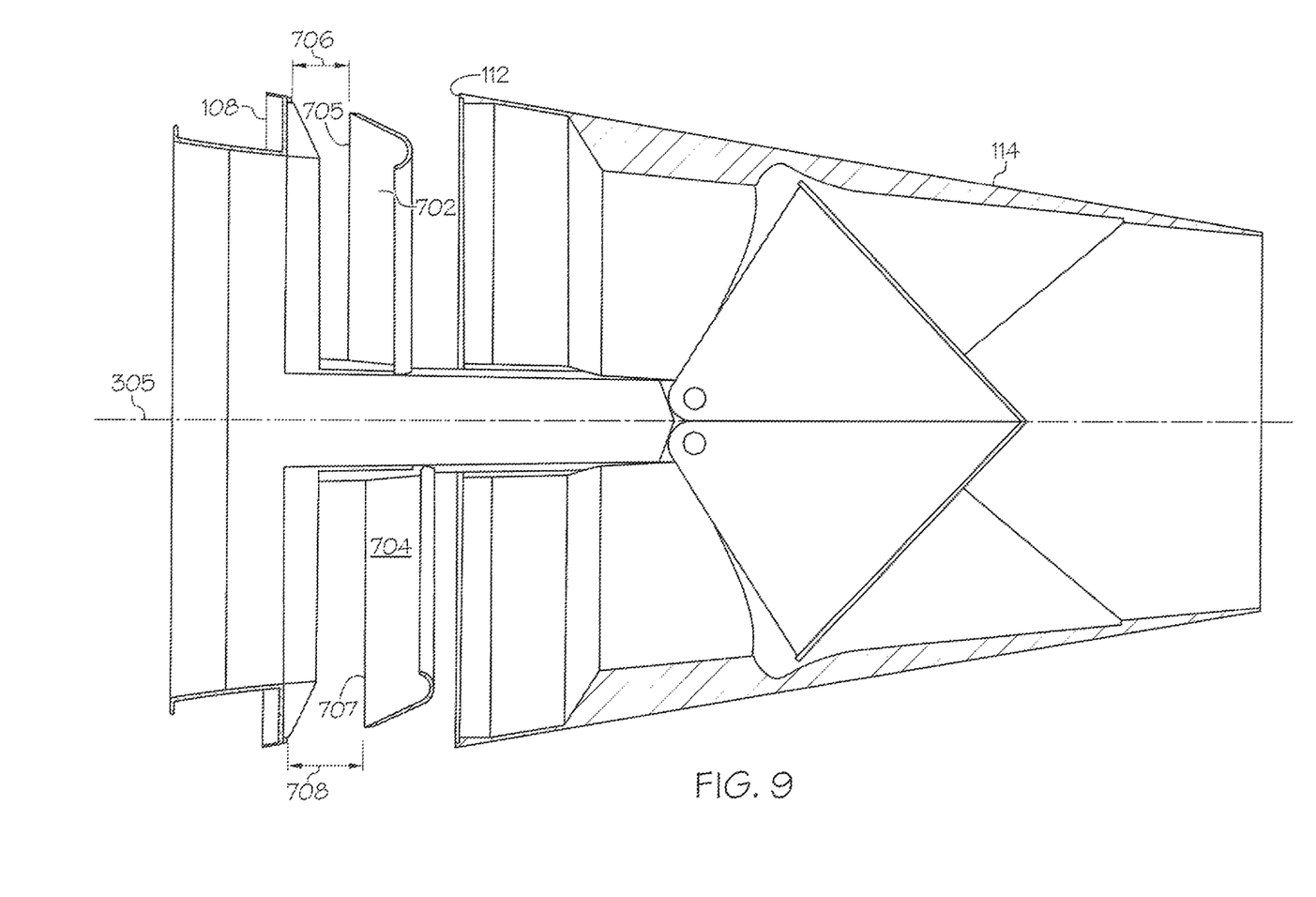
FIG. 9 is a cutaway view, outboard looking inboard, of a thrust reverser system according to another exemplary embodiment.

FIG. 9 is a cutaway view of a thrust reverser system according to another exemplary embodiment. In FIG. 9, the upper portion 420 (comprising vane 702) and lower portion 450 (comprising vane 704) comprise a single row asymmetric vane assembly. In FIG. 9, first vane trailing edge 705 (shown with respect to vane 702) is positioned a distance L1 706 from the support structure 108. Second vane trailing edge 707 (shown with respect to vane 704) is positioned a distance L2 708 from the support structure 108. In the embodiment of FIG. 9, L1 is not equal to L2, W1 is equal to W2, and exit angle alpha is equal to exit angle gamma. Configuring the upper portion 420 (comprising vane 702) and lower portion 450 (comprising vane 704) such that L1 is not equal to L2 is an asymmetric vane geometry approach that results in the generation of a desired vertical thrust component that offsets at least a portion of the undesirable nose-up pitch moment.

Figure 10:
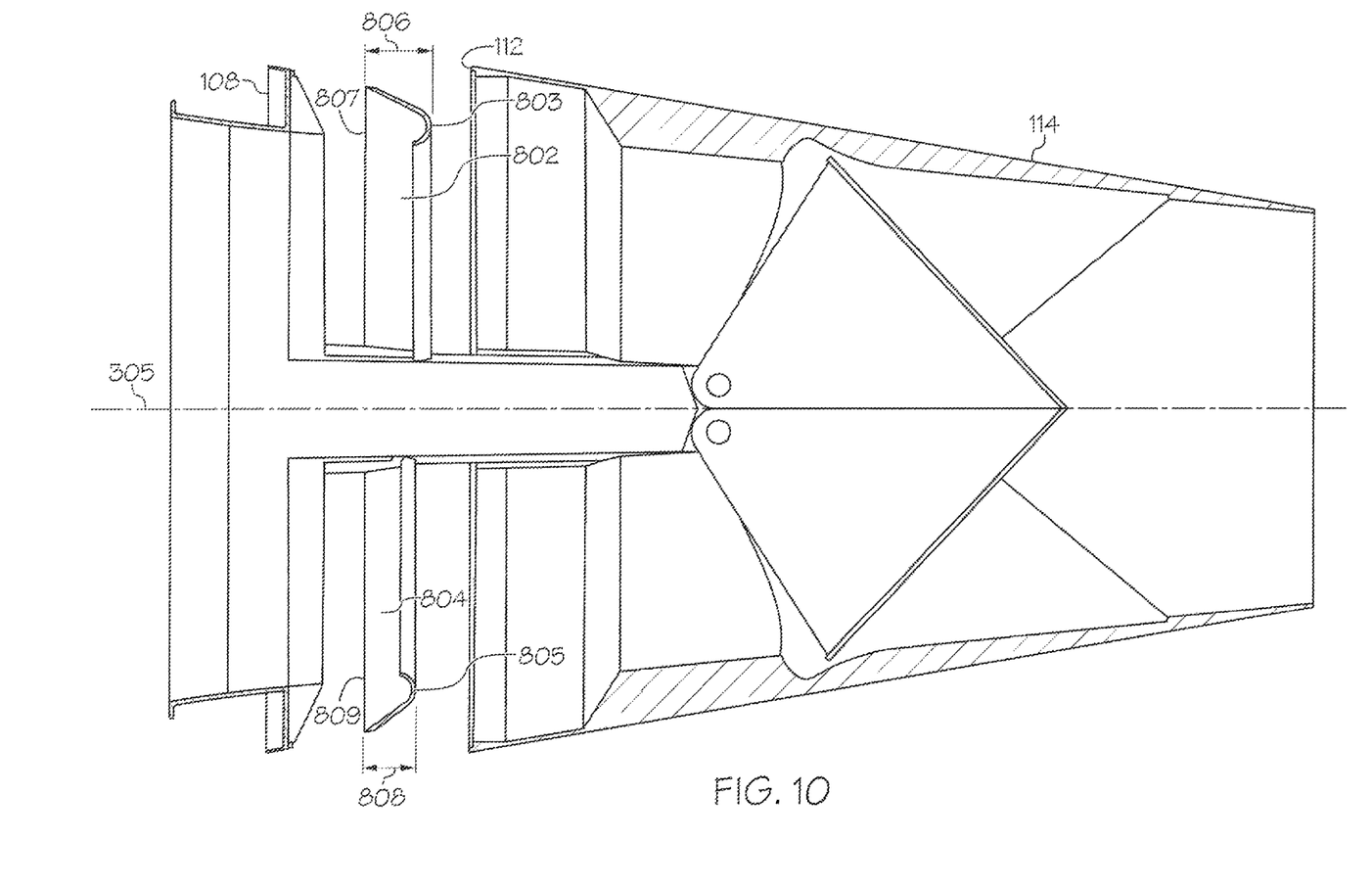
FIG. 10 is a cutaway view, outboard looking inboard, of a thrust reverser system according to yet another exemplary embodiment.

FIG. 10 is a cutaway view of a thrust reverser system according to yet another exemplary embodiment. In FIG. 10, the upper portion 420 (comprising vane 802) and lower portion 450 (comprising vane 804) comprise a single row asymmetric vane assembly. As previously described, upper portion 420 of single row asymmetric vane assembly has a shape that comprises a first knee 803, and a width W1 806 is defined as a distance from the first vane trailing edge 807 to the first knee 803 (shown with respect to vane 802). Similarly, lower portion 450 of single row asymmetric vane assembly has a shape that comprises a second knee 805, and a width W2 808 is defined as a distance from the second vane trailing edge 809 to the second knee 805 (shown with respect to vane 804). In the embodiment depicted in FIG. 10, L1 is equal to L2, W1 is greater than W2, and exit angle alpha is equal to exit angle gamma. Configuring the upper portion 420 (comprising vane 802) and lower portion 450 (comprising vane 804) such that W1 is greater than W2 is an asymmetric vane geometry approach that results in the generation of a desired vertical thrust component that offsets at least a portion of the undesirable nose-up pitch moment.

Figure 11:
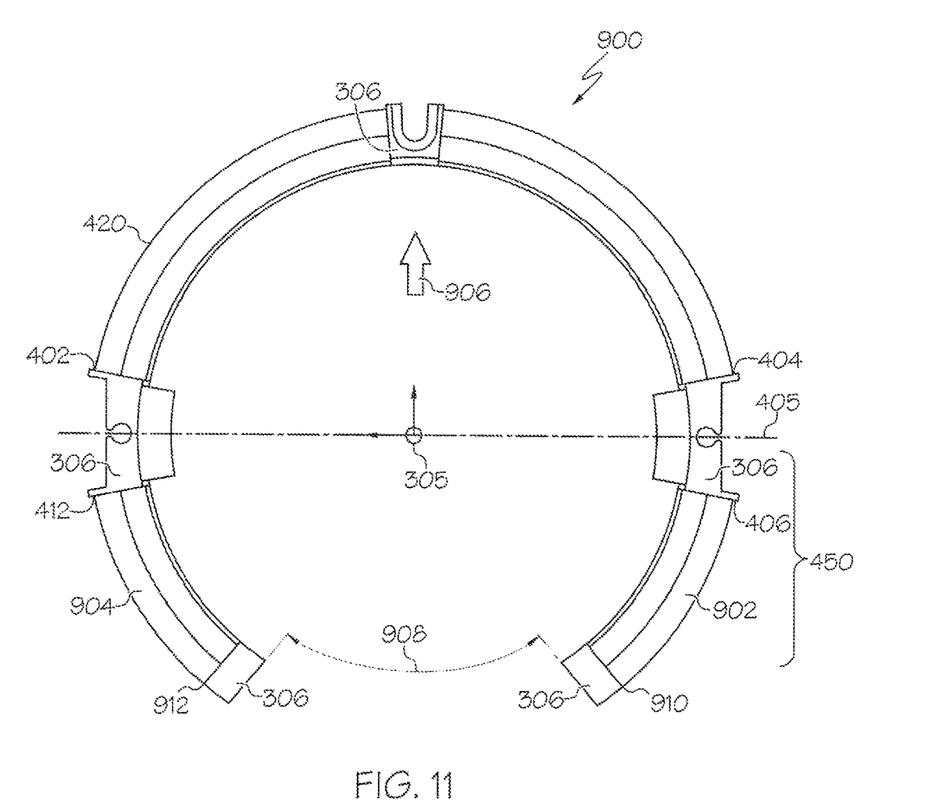
FIG. 11 is a cutaway view, forward looking aft, of a single row asymmetric vane assembly according to still another exemplary embodiment.

With reference back to FIG. 7, lower portion 450 is shown having two sections, first section 422 and second section 424. It is contemplated that the lower portion 450 may comprise a gap. The embodiment shown in FIG. 11 depicts a gap in the lower portion 450 between the first section 422 and second section 424. In the embodiment shown in FIG. 11, the sections comprising lower portion 450 are circumferentially shorter than the respective sections shown in FIG. 7. First section 422, comprising vane 902 extends from 406 to 910, and second section 424, comprising vane 904 extends from 412 to 912. Gap 908 is a region of lower portion 450 that does not have a vane, a support beam, or any other obstruction; gap 908 is positioned and sized anywhere along lower portion 450 to meet an application specific need. Having a gap therein increases flow capacity in the vicinity of the gap 908. The inclusion of a gap (or, the omission of a vane or support beam) in the lower portion 450 is an asymmetric vane geometry approach that results in the generation of a desired vertical thrust component that offsets at least a portion of the undesirable nose-up pitch moment.

Figure 12:
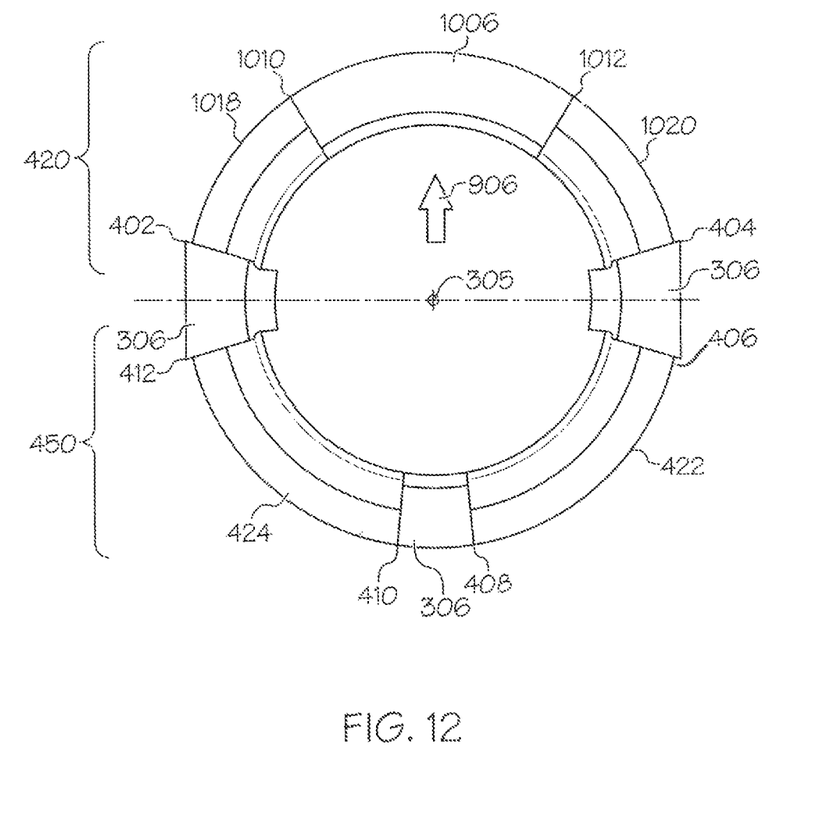
FIG. 12 is a cutaway view, forward looking aft, of a single row asymmetric vane assembly according to still another exemplary embodiment.

Again referencing FIG. 7, upper portion 420 is shown comprising two sections, first section 430 and second section 432. It is contemplated that the upper portion 420 may comprise an obstruction located in between 402 and 404. FIG. 12 depicts an obstruction in the upper portion 420. In the embodiment shown in FIG. 12, the sections comprising upper portion 420 are shorter than the respective sections shown in FIG. 7. Upper first section 1018 extends from 402 to 1010, and upper second section 1020 extends from 1012 to 404. Obstruction 1006 is a region of upper portion 420 that is obstructed by an extended support beam or other material obstruction, and may be located anywhere along the path from 402 to 404, thereby obstructing at least a portion of upper first section 1018 and/or upper second section 1020. When present, obstruction 1006 decreases flow capacity in upper portion 420, in the vicinity of the obstruction 1006. Upper portion 420 may be configured such that obstruction 1006 is positioned and sized to meet an application specific need. Employing an obstruction 1006 in the upper portion 420 is an asymmetric vane geometry approach that that results in generation of a desired vertical thrust component that offsets at least a portion of the undesirable nose-up pitch moment.

In the embodiments of FIG. 11 and FIG. 12, as with previously introduced embodiments, vanes comprising upper portion 420 have substantially matching dimensions, and vanes comprising the lower portion 450 also have substantially matching dimensions (i.e., all vanes comprising first section 902 and second section 904 have substantially matching dimensions). The embodiments in FIG. 11 and FIG. 12, therefore, may employ asymmetry by virtue of the asymmetry provided by gap 908 and/or obstruction 1006 as well as by the asymmetry approaches introduced in connection with FIGS. 8-10, in dimensions of vanes comprising the upper portion 420 and lower portion 450.

Arrow 906 illustrates the desired vertical thrust component that is generated by each of the exemplary embodiments shown in FIGS. 8-12. Although the figures are not to scale, comparing FIGS. 8-12 provides a first-pass visual understanding of various ways in which asymmetry of the upper portion and lower portion may be employed in a single row asymmetric vane assembly for use in a thrust reverser system to offset at least a portion of the undesirable nose-up pitch moment. The exemplary embodiments shown in FIGS. 8-12 present one asymmetric vane geometry approach at a time for ease of comprehension, however, it is readily understood that in practice, the various approaches may be combined to meet an application specific need.

As was described above, each of FIGS. 8-12 are cutaway views, therefore, when rotated into three dimensions, and with reference to FIG. 6, the asymmetric vane assembly comprises an upper portion 420 (substantially a semicircle above centerline 405) that is asymmetric with respect to the lower portion 450 (substantially a semicircle below centerline 405). The provided asymmetric vane assembly is configured to be disposed within an aperture formed by a deployed transcowl within a thrust reverser system.

In each of the provided embodiments, the upper portion 420 may comprise one or more vanes, and the lower portion 450 may comprise one or more vanes. In order to maintain the asymmetry described, features of vanes in the upper portion 420 match, and features of vanes in the lower portion 450 match. In other words, each vane of a plurality of vanes comprising the upper portion 420 comprises substantially matching dimensions (i.e., each L1, exit angle alpha, and W1 for each vane comprising upper portion 420 is substantially equal), and each vane of a plurality of vanes comprising lower portion 450 comprises substantially matching dimensions (i.e., each L2, exit angle gamma, and W2 for each vane comprising lower portion 450 is substantially equal).

Thus there has been provided a thrust reverser system with asymmetric vane geometry. The provided thrust reverser system generates a desired vertical thrust component based on reverse thrust, in order to offset at least a portion of a potential nose-up pitch moment during reverse thrust. The provided single row asymmetric vane geometry may replace a plurality of cascade vanes commonly employed in thrust reversers. The reduced amount of material required to produce each of the above described single row asymmetric vane assemblies advantageously reduces weight and cost over designs that employ a plurality of cascade vanes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Some of the embodiments and implementations are described above reference functional and/or logical block components (or modules), for example, an actuator. However, it should be appreciated that such block components (or modules) may be realized by any number of hardware, software, and/or firmware components configured to perform the specified functions. To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A thrust reverser system for a turbine engine, comprising:
   a support structure configured to be mounted to the engine;
   a transcowl mounted on the support structure and comprising a front edge, the transcowl movable between a first position, in which the front edge abuts the support structure, and a second position, in which an aperture is formed between the front edge and the support structure;
   a blocking assembly mounted within the transcowl and configured to direct engine airflow to discharge through the aperture, to thereby generate reverse thrust, when the transcowl is in the second position; and
   an asymmetric vane assembly disposed within the aperture and configured such that an upper portion of the asymmetric vane assembly is asymmetric with respect to a lower portion of the asymmetric vane assembly, thereby generating a desired vertical thrust component based on the reverse thrust;
   wherein the upper portion and lower portion of the asymmetric vane assembly each comprises a plurality of vanes in a single row; and
   wherein (i) the upper portion of the asymmetric vane assembly comprises a first vane trailing edge that is positioned a distance L1 from the support structure, (ii) the lower portion of the asymmetric vane assembly comprises a second vane trailing edge that is positioned a distance L2 from the support structure, and (iii) wherein L1 is not equal to L2.

2. The thrust reverser system of claim 1, wherein the upper portion of the asymmetric vane assembly comprises an obstruction.

3. The thrust reverser system of claim 1, further comprising at least one of: (i) the lower portion of the asymmetric vane assembly comprises a gap and (ii) the upper portion of the asymmetric vane assembly comprises an obstruction.

4. A thrust reverser system for a turbine engine, comprising:
a support structure configured to be mounted to the engine;
a transcowl mounted on the support structure and comprising a front edge, the transcowl movable between a first position, in which the front edge abuts the support structure, and a second position, in which an aperture is formed between the front edge and the support structure;
a blocking assembly mounted within the transcowl and configured to direct engine airflow to discharge through the aperture, to thereby generate reverse thrust, when the transcowl is in the second position; and
an asymmetric vane assembly disposed within the aperture and configured such that an upper portion of the asymmetric vane assembly is asymmetric with respect to a lower portion of the asymmetric vane assembly, thereby generating a desired vertical thrust component based on the reverse thrust;
wherein the upper portion and lower portion of the asymmetric vane assembly each comprises a plurality of vanes in a single row; and
wherein (i) the upper portion of the asymmetric vane assembly is shaped to curve forward at an exit angle alpha from a first knee defined by a plane extending perpendicularly from the thrust reverser centerline, (ii) the lower portion of the asymmetric vane assembly is shaped to curve forward at an exit angle gamma from a second knee defined by a plane extending perpendicularly from the thrust reverser centerline, and (iii) exit angle alpha is greater than exit angle gamma.

5. The thrust reverser system of claim 4, wherein the exit angle alpha is more than forty-five degrees and exit angle gamma is less than forty-five degrees.

6. The thrust reverser system of claim 4, further comprising at least one of:
(i) the lower portion of the asymmetric vane assembly comprises a gap and (ii) the upper portion of the asymmetric vane assembly comprises an obstruction.

7. A thrust reverser system for a turbine engine, comprising:
a support structure configured to be mounted to the engine;
a transcowl mounted on the support structure and comprising a front edge, the transcowl movable between a first position, in which the front edge abuts the support structure, and a second position, in which an aperture is formed between the front edge and the support structure;
a blocking assembly mounted within the transcowl and configured to direct engine airflow to discharge through the aperture, to thereby generate reverse thrust, when the transcowl is in the second position; and
an asymmetric vane assembly disposed within the aperture and configured such that an upper portion of the asymmetric vane assembly is asymmetric with respect to a lower portion of the asymmetric vane assembly, thereby generating a desired vertical thrust component based on the reverse thrust;
wherein the upper portion and lower portion of the asymmetric vane assembly each comprises a plurality of vanes in a single row; and
wherein (i) a width W1 of the upper portion of the asymmetric vane assembly is measured from a first vane trailing edge to a first knee, (ii) a width W2 of the lower portion of the asymmetric vane assembly is measured from a second vane trailing edge to a second knee, and (iii) W1 is not equal to W2.

8. The thrust reverser system of claim 7, further comprising at least one of:
(i) the lower portion of the asymmetric vane assembly comprises a gap and (ii) the upper portion of the asymmetric vane assembly comprises an obstruction.

* * * * *